United States Patent

Prowse et al.

[15] 3,661,137
[45] May 9, 1972

[54] SAW ELEMENTS

[72] Inventors: Derek Henry George Prowse; Stephen Derek Prowse, both of Marina-Di-Carrara, Italy

[73] Assignee: Industrial Distributors (Sales) Limited, London, England

[22] Filed: Oct. 7, 1969

[21] Appl. No.: 864,506

[30] Foreign Application Priority Data

Oct. 18, 1968 Great Britain......................49,578/68

[52] U.S. Cl.............................................................125/21
[51] Int. Cl............................................................B28d 1/08
[58] Field of Search................................................125/12, 21

[56] References Cited

UNITED STATES PATENTS 2,773,495  12/1956  Lefevre...................................125/21
2,679,839  6/1954  Metzger..................................125/21

FOREIGN PATENTS OR APPLICATIONS 907,347   10/1945  France....................................125/21
816,631   7/1959   Great Britain..........................125/21
1,088,408 9/1960   Germany................................125/21

*Primary Examiner*—Harold D. Whitehead
*Attorney*—Holman & Stern

[57] ABSTRACT

A saw element in which an elongate carrying member for example a wire has threaded thereon a plurality of hard beads free to rotate on the wire and having outer abrasive surfaces which are convex in the direction of the carrying member, with these abrasive elements which preferably include diamond particles as an abrasive medium being interspersed with non-abrasive spacer elements which grip the wire.

10 Claims, 4 Drawing Figures

PATENTED MAY 9 1972 3,661,137

INVENTOR
DEREK HENRY GEORGE
BY      PROWSE ET AL
ATTORNEYS

SAW ELEMENTS

BACKGROUND OF THE INVENTION

This invention relates to saw elements particularly useful in the cutting of stone, marble, granite, refractories, plastics, fiberglass, metals, ceramics and other materials.

Marble, for example, is commonly cut at a quarry face or in a cutting works by means of an endless wire using an abrasive slurry as a cutting medium. This is a slow process, and one object of the present invention is to provide a means for cutting marble, rock and the like at a quicker rate.

SUMMARY OF THE INVENTION

The invention provides, according to one of its aspects, a saw element in the form of an elongate carrying member such as a wire, and abrasive impregnated or abrasive coated hard beads threaded onto the wire, with the beads having a convex outer abrasive surface portion in the direction of extent of the carrying member and being free to rotate on the carrying member.

The abrasive elements may be interspaced with non-abrasive elements, each of which is fixed to the carrying member, thereby allowing freedom of rotational, but not lateral movement, of the abrasive elements.

The abrasive impregnated or coated beads may each be spherical, barrel or ellipsoidal in shape with an axial threading bore, they may have non-abrasive carrying end portions, and may be coated by electrodeposition or by other means with an abrasive which could be boron or other carbide, carborundum material, but preferably the abrasive is wholly or in part constituted by natural or synthetic diamond particles. The size and amount of abrasive particles in the beads will be dependant on the cutting application.

The invention provides, according to another of its aspects, for the beads to be impregnated with abrasives of a similar nature to those used in the electrodeposition process. Alternatively, the beads may be surface set with large abrasive particles when the nature of the material to be cut demands the use of large protruding particles.

The methods by which the abrasive elements are manufactured can vary according to the type of material to be cut. When using an electrodeposition method for the abrasive, it is considered more efficient to manufacture a length of shaped material such as brass, steel or a combination of metals, and after plating with abrasive, cut the individual beads from the plated length. This method could also be used for impregnated elements where a sintered or infiltrated cast length of abrasive impregnated metal would afterwards be cut into individual beads, although it is considered that a more economical method of manufacture for sintered or infiltrated beads would be to use an automatic casting machine manufacturing individual beads with cast outer convex surfaces.

When using surface set abrasives including diamond, the abrasive would be set in a mold or molds shaped to form the contours of the required element, after placing the abrasive in position, the mold would be filled with metal powder, (this powder varying in particle size and constituency according to the abrasive resistant qualities required), and afterwards, pressed heated to a temperature consistent to the material being sintered or infiltrated in an atmosphere also suitable for that material.

The material of the carrying member on which the beads or elements are threaded, can be single or multistrand wire, nylon or any other material which will withstand a static tension and cutting pressure. A low stretch coefficient is useful but not essential. The diameter of the material carrying the elements may vary according to the material to be cut, the tension required, the cutting pressure and the degree of flexibility desired.

It is contemplated that the major use of the element will be in the form of an endless saw, but other uses are considered, whereby a wire or rod of various materials is fitted with abrasive and non-abrasive elements and used with a reciprocal motion for cutting.

According to a further feature of the invention, the saw element may, depending on the use to which it is to be put, include further non-abrasive including beads on and gripping the carrying element, non-abrasive beads or groups of non-abrasive beads being interposed between abrasive beads or groups of abrasive beads. The non-abrasive beads grip the wire to prevent loss of beads if the wire should break and to prevent the wire from sliding longitudinally in the beads. In a complete saw element there should be sufficient beads so that the spacing between adjacent beads permits rotation of the abrasive beads while substantially preventing longitudinal movement of the beads along the wire.

Accordingly, a preferred form of cutting tool according to the invention will be composed of the following items:

1. A flexible wire, rod or like elongate carrying member manufactured to an arbitrary length.
2. The abrasive elements which shall be free to rotate on the carrying member (1), and
3. Non-abrasive elements which are interspaced between those with abrasive and fixed to the carrying member (1) by means of crimping, welding, brazing, or in the case where nylon or plastic carrying wires or rods are used, with a suitable jointing or adhesive compound.

In the case of an endless carrying member, a method of joining the ends of the wire or other material must be used. This, of course, would vary according to the material, but crimping, splicing, welding or brazing is considered the most suitable with provision for a combination of these methods. An adhesive compound could be used when the carrying element is of nylon or a plastic material.

The shape of the non-abrasive elements is relatively unimportant, as their main purpose is to provide for a space between the abrasive elements and to prevent the abrasive elements moving laterally along the carrying member. It is considered, in particular to the endless wire, that the shape of the non-abrasive elements should be such, that a convex surface is presented to a pulley carrying the wire and to the material being cut to prevent any percussive movement or vibration.

The convex shape of the abrasive elements is essentially universal for all applications, but in the case of cutting highly abrasive soft material where it is necessary to have an unusual degree of protrusion of the diamond or other abrasive particles, then the surface of the abrasive element or bead can be varied to provide this feature.

The number of non abrasive elements used in proportion to those carrying abrasive, can be varied according to the material to be cut and the peripheral or surface speed of the wire in proportion to the required feed rate. The length of the individual non-abrasive elements or beads can also be varied for a similar reason.

Depending on the cutting application, single abrasive beads may alternate on the wire with single non-abrasive beads, or groups of one type of bead may alternate with groups or single beads of the other type.

It is expected, that when cutting any material, the convex outer shape of the abrasive beads and their freedom to rotate will minimize the percussive effects at the edges of the material, and also by rotating will utilize the whole of the abrasive surface. The element will be used with a non-abrasive lubricant.

The invention will now be described by way of an example with reference to the accompanying drawings which are sectional side views of four alternative types of cutting element.

DETAILED DESCRIPTION OF THE EMBODIMENTS

Figure 1:
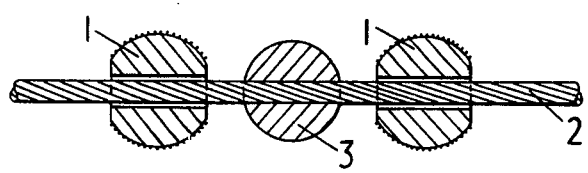
FIG. 1 is a view partly in elevation and partly in cross-section of a saw element.

In FIG. 1, barrel shaped abrasive coated elements 1 are threaded on a wire 2, with these elements being free to rotate on the wire and being interspersed with non-rotary non-abrasive carrying elements 3 crimped on the wire to grip the same. (For example, a non-abrasive element having an axial bore may be radially slit to position it on the wire between a pair of abrasive elements and then crimped onto the wire).

Figure 2:
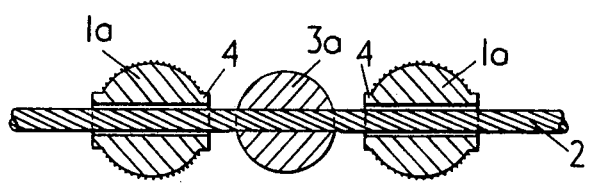
FIGS. 2–4 are views similar to FIG. 1 several embodiments of the invention.

In FIG. 1 abrasive particles extend over substantially the entire outer surface of elements 1 and it will be seen that the abrasive particles, when rotating, would tend to abrade the crimped, non-abrasive elements 3. Two methods may be used to prevent this occurring as follows:

As shown in FIG. 2, the abrasive particles on the abrasive elements 1a are prevented from touching the non-abrasive elements 3a by stopping the abrasive particle coverage of elements 1, before the end of the abrasive element, thus producing a plain non-abrasive bearing surface 4. To further aid the free running movement of the abrasive element, the non-abrasive element can be made in three sections 3b, 3c and 3d as shown in FIG. 3, with the two outer sections 3b and 3d being free to revolve while the center non-abrasive section 3c remains fixed to the carrying member 2 i.e. the wire, cable or cord.

Figure 4:
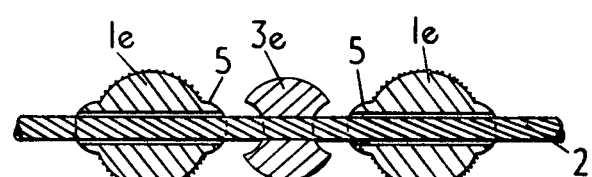

As shown in FIG. 4, the abrasive particles on the abrasive elements 1e are prevented from touching the non-abrasive elements 3e by restricting the abrasive particle coverage, before the end of the abrasive element, thus producing a plain non-abrasive bearing surface 5. To restrict the free running movement of the abrasive element, each end of these elements thus has a male cone 5a fitting which corresponds with a similar female cone fitting 5b in the fixed, non-abrasive elements. Thus, while under cutting pressure, the abrasive elements would be prevented from rotating by this cone clutch method, and wear through friction would also be reduced.

Figure 3:
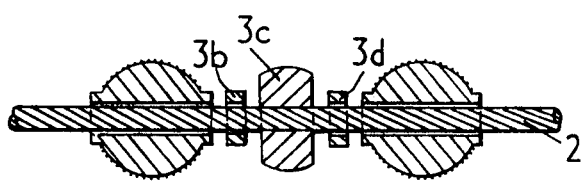

In the event of it being necessary to reduce the number of abrasive elements in proportion to those carrying abrasives, the additional non-abrasive elements will be fitted in the manner of the abrasive elements incorporating the design shown in FIGS. 2 to 4 or a combination of such designs.

Saw elements according to the invention can have an infinite variation in length, diameter of element and diameter of carrying element. It is envisaged that such saw elements will have three major uses:

1. The cutting of geological materials in situ as in the case of mining, tunnelling and quarrying. The wire and elements will, in this case, revolve around two pulleys, one of which will have a cutting face and the other will be driven by a motor having electricity, air or an internal combustion engine as the motive power unit. The cutting pulley and wire will be fed into the material by screw or hydraulic means and afterwards moved in the required direction by similar means.
2. The cutting of blocks of stone, marble, granite, refractory, graphite etc., when the wire and elements will revolve around two or more pulleys which can be moved downwards by means of a screw or hydraulic feed unit. The material which shall be placed under the wire between the pulleys, shall be cut freely by the wire during its descent. It is envisaged that in this application, multiple pulleys will be employed in order to produce a number of cuts during one descent of the machine.
3. The cutting of plastics, fiberglass, hard metals or the like. with a small machine which can be hand held or used as part of an existing cutting machine. The wire and cutting elements to be used in either a rotary motion, revolving around two pulleys, or in a reciprocating motion.

All the above methods can be used with either air, water, or oil as a coolant.

The endless element or reciprocating wire is less susceptible to self abrasion than any present method in use, and the whole of the abrasive area can be fully utilized.

We claim:

1. A saw element for use in the cutting of stone, marble, refractories, plastics, metals, ceramic and other materials comprising an endless flexible carrying member, abrasive elements in the form of hard beads loosely threaded on the carrying member, said beads each having an outer abrasive surface portion, said outer abrasive surface portion being convex in the direction of extent of the carrying member, and discrete non-abrasive elements between at least some of said abrasive elements, the non-abrasive elements gripping the carrying member to prevent relative rotation between the non-abrasive elements and the carrying member while maintaining the abrasive elements in spaced apart relationship for freedom of rotational but not lateral movement relative to the carrying member.

2. The saw element as claimed in claim 1 wherein said abrasive elements are abrasive coated to provide said surface outer abrasive surface portion.

3. The saw element as claimed in claim 1 wherein said abrasive elements are abrasive impregnated.

4. The saw element as claimed in claim 1 wherein said abrasive elements include diamond particles as an abrasive medium.

5. The saw element as claimed in claim 1 wherein said abrasive elements are provided with opposite end portions free of abrasive elements, with said end portions preventing the outer abrasive surface portion of the abrasive elements from touching the non-abrasive elements.

6. The saw element as claimed in claim 5 wherein said outer surface portion is barrel shaped and said opposite end portions are non-barrel shaped extensions of said outer surface convex portion.

7. The saw element as claimed in claim 1 wherein said non-abrasive elements are crimped onto the carrying member.

8. The saw element as claimed in claim 1 wherein said non-abrasive elements have concave end portions complementary to the end portions of adjacent abrasive elements.

9. The saw element as claimed in claim 1 wherein each of said non-abrasive elements includes a center section gripping the carrying member and two outer sections capable of rotation on the carrying member.

10. The saw element as claimed in claim 1 in which said non-abrasive elements each have an outer surface which is convex in the direction of extent of the carrying member.

* * * * *